United States Patent
Bassett et al.

(10) Patent No.: US 6,800,200 B2
(45) Date of Patent: Oct. 5, 2004

(54) DUAL-FLOW FILTER CARTRIDGE

(75) Inventors: Laurence W. Bassett, Killingworth, CT (US); William Contaxis, III, Milford, CT (US)

(73) Assignee: Cuno Incorporated, Meriden, CT (US)

( * ) Notice: Subject to any disclaimer, the term of this patent is extended or adjusted under 35 U.S.C. 154(b) by 31 days.

(21) Appl. No.: 10/125,323

(22) Filed: Apr. 18, 2002

(65) Prior Publication Data

US 2003/0196948 A1 Oct. 23, 2003

(51) Int. Cl.⁷ ............................................. B01D 29/58
(52) U.S. Cl. .................. 210/315; 210/338; 210/342; 210/420; 210/424; 210/434; 210/440; 55/350.1
(58) Field of Search ................................. 210/109, 110, 210/130, 132, 133, 134, 314, 315, 335, 337, 338, 340–342, 420, 422, 424, 433.1, 434, 440, 443, 444, 449, 423, 446; 55/318, 350.1, 486–489

(56) References Cited

U.S. PATENT DOCUMENTS

| | | | |
|---|---|---|---|
| 608,127 A | * | 7/1898 | Petersen |
| 1,370,685 A | * | 3/1921 | Denker et al. |
| 1,726,839 A | * | 9/1929 | Kasztory |
| 2,929,506 A | | 3/1960 | Belgarde |
| 3,278,034 A | * | 10/1966 | West |
| 3,388,802 A | | 6/1968 | Wilkinson |
| 4,592,838 A | | 6/1986 | Christophe et al. |
| 4,882,061 A | | 11/1989 | Petrucci et al. |
| 5,082,557 A | | 1/1992 | Grayson et al. |
| 5,082,568 A | | 1/1992 | Holler |
| 5,107,896 A | | 4/1992 | Otto |
| 5,143,601 A | | 9/1992 | Slovak et al. |
| 5,342,511 A | | 8/1994 | Brown et al. |
| 5,378,363 A | | 1/1995 | Christophe et al. |
| 5,552,040 A | | 9/1996 | Baehler et al. |
| 5,591,330 A | | 1/1997 | Lefebvre |
| 5,622,626 A | | 4/1997 | Matkovich et al. |
| 5,695,637 A | | 12/1997 | Jiang et al. |
| 5,744,033 A | | 4/1998 | Bertrand et al. |
| 5,922,208 A | | 7/1999 | Demmers |
| 5,993,648 A | | 11/1999 | Hunter et al. |
| 6,024,869 A | | 2/2000 | Stifelman |
| 6,068,762 A | | 5/2000 | Stone et al. |
| 6,139,725 A | | 10/2000 | Barr et al. |
| 2003/0168397 A1 | * | 9/2003 | Roper et al. |

FOREIGN PATENT DOCUMENTS

| | | |
|---|---|---|
| EP | 0 256 734 A1 | 2/1988 |
| EP | 0 275 148 A2 | 7/1988 |
| EP | 0 844 229 A2 | 5/1998 |
| GB | 1 604 834 | 12/1981 |

OTHER PUBLICATIONS

PGPUBS Document US2003/0168397 Roper et al, published Sep. 11, 2003.*

PCT International Search Report, PCT/US03/09410 (8 sheets).

* cited by examiner

Primary Examiner—Joseph Drodge
(74) Attorney, Agent, or Firm—R. Thomas Payne; John A. Tomich

(57) ABSTRACT

A filter cartridge configured to provide two or more levels of fluid filtration or conditioning from within a single filter cartridge is disclosed, the filter cartridge including a housing that defines an interior cavity and has an inlet portion for receiving fluid into the cavity, a first outlet portion for discharging fluid from the housing, and a second outlet portion for discharging fluid from the housing. The filter cartridge also includes a first stage filter disposed within the interior cavity for conditioning fluid passing therethrough, the first stage filter in fluid communication with the inlet portion and the first outlet portion by way of a first flow path, and a second stage filter disposed within the interior cavity of the housing for conditioning fluid passing therethrough, the second stage filter in fluid communication with the inlet portion and the second outlet portion by way of a second flow path.

30 Claims, 9 Drawing Sheets

DUAL-FLOW FILTER CARTRIDGE

BACKGROUND OF THE INVENTION

1. Field of the Invention

The subject invention relates to a filter cartridge for use in fluid filtration, and more particularly, to a filter cartridge configured to provide two or more levels of fluid filtration.

2. Background of the Related Art

Many residential, industrial and healthcare applications require the fluid used therein to be filtered prior to use. For example, in the United States, residential public water supplies are commonly treated with various chemicals, such as chlorine, to disinfect the water and avoid potential adverse health effects. However, these chemicals can have an undesirable effect on the taste and odor of the water, and may not provide the level of cleanliness desired for consumption. Consequently, many residences now filter their tap water or purchase bottled water for cooking and drinking.

Not all fluid applications within a residence require the same level of filtration or conditioning, nor is it cost effective to treat all of the water to the same degree. For example, the water used in washing the family car or for watering the lawn does not require the same level of filtration as potable water. Additionally, it may be desired to provide water having a specific or distinct level of filtration or softness for dish washing, bathing or the laundry. Therefore, in a residence it is desirable to provide water having two or more levels of filtration.

There is also a need to provide two or more levels of fluid filtration in other applications, such as in industrial or healthcare applications. In the healthcare industry, fluids administered parenternally to a patient must to be filtered prior to administration. Typically, filtration of a parenternal fluid is achieved by passing it through a filter apparatus which includes a porous medium. In some protocols continuous or long term administration of several parental fluids is required and each fluid is passed through the same filter apparatus, along the same flow path and through the same porous medium. There are disadvantages associated with the use of a single if flow path and providing a single level of filtration for all administered fluids. For example, the same porous medium may not be suitable or equally efficient for processing different parenternal fluids.

Traditionally, only one level of filtration or conditioning can be obtained from a single filter cartridge or assembly. In such filters, unfiltered fluid enters into the cartridge through an inlet port, passes through filter media disposed within the cartridge and discharges through a single outlet port. These traditional filter cartridges may contain multiple media types, but the fluid traverses through the media over a single flow path, resulting in flow through all media in turn or in series.

In residential applications, one method of obtaining two levels of filtration from a single filter assembly has been to provide an assembly that is configured to allow the user to select between filtered water or unfiltered water, as disclosed for example in U.S. Pat. No. 5,744,033 to Bertrand. Another solution consists of adding components to the filtration system or assembly, or more particularly, by designing manifold systems which utilized platforms and multiple filter cartridges. U.S. Pat. No. 5,107,896 to Otto is an example of a manifold-type system that achieves a second level of filtration by adding filter cartridges to the system. However, increasing the number components, increases the system complexity, cost and space requirements.

There is a need, therefore, for a fluid filtration apparatus having a cartridge which is configured to simultaneously provide two separate discharges of fluid from a single source, each discharged fluid having been subjected to a distinct level of conditioning or filtering. By providing two levels of filtration from a single filter cartridge, the need for additional hardware can be eliminated, thereby simplifying the installation and maintenance of the fluid treatment system and reducing the number of components required.

SUMMARY OF THE INVENTION

The subject invention is directed to a new and improved dual-flow filter cartridge that includes a housing, a first stage filter and a second stage filter. The housing defines a central axis and an interior cavity and includes an inlet portion for receiving fluid into the interior cavity, a first outlet portion for discharging fluid from the interior cavity, and a second outlet portion for discharging fluid from the interior cavity.

The first stage filter is disposed within the interior cavity of the housing for conditioning fluid passing therethrough and is in fluid communication with the inlet portion and the first outlet portion by way of a first flow path. The second stage filter is also disposed within the interior cavity of the housing and conditions the fluid passing therethrough. The second stage filter is in fluid communication with the inlet portion and the second outlet portion by way of a second flow path.

The filter cartridge further includes a mechanism for selectively directing the flow of the fluid through the interior cavity of the housing. The mechanism is configured to selectively direct the flow of fluid through the first flow path, in which fluid traverses through the first stage filter and exits the housing through the first outlet portion. The mechanism is also configured to direct the flow of fluid through the second flow path, through which fluid traverses the first stage filter, the second stage filter and exits the housing through the second outlet portion. Alternatively, the mechanism can direct the flow through the first and second flow paths simultaneously. In a preferred embodiment, the mechanism for selectively directing the flow of the fluid through the interior cavity of the housing is positioned external to the filter cartridge housing.

In a preferred embodiment, the first stage filter and the second stage filter are coaxially positioned relative to one another within the interior cavity of the housing. In this embodiment, the first stage filter has a hollow core and the second stage filter is disposed within the hollow core of the first stage filter. Typically, the first stage filter includes at least one filter media for conditioning the fluid. The filter media can be a sediment-type filter (e.g. resin bonded cellulose), a carbon block filter, a hollow fiber filter or any other media suitable for filtering fluid or a combination of media types. In this embodiment, it is envisioned that the first flow path is substantially radial within the interior cavity of the housing through the first stage filter.

The second stage filter also includes at least one filter media for conditioning the fluid. The at least one filter media can be a hollow fiber filter media or any other media suitable for filtering fluid or a combination of media types. In this embodiment, it is envisioned that the second flow path traverses through both the first and second stage filters, substantially in the radial direction within the interior cavity of the housing through the second stage filter. Alternatively, the second flow path only traverses the second stage filer.

Preferably, the filter cartridge further includes a structure for directing the flow of fluid through the first flow path and the second flow path. In one embodiment, the structure is defined by an end cap disposed within the interior cavity of the housing and has surfaces dimensioned and configured for directing the flow of fluid within the housing. In this embodiment, the end cap can be positioned at the base of the filter media or at the top of the filter media, or in both locations. In another embodiment, the end cap is disposed within the filter media, for example, at the mid-height or thereabout.

It is envisioned that the structure for directing fluid through the first flow path and the second flow path is integral with the housing. However, it can be a separate and distinct member that can be inserted into the interior cavity or removed as desired.

The subject invention is also directed to a filter apparatus which includes a head and a filter cartridge. The head having an inlet flow port, an outlet flow port, means for securing the head in fluid communication with a fluid supply, and fixture for securably attaching a filter cartridge to the head. The filter cartridge includes a housing which defines a central axis and an interior cavity. The housing has an inlet portion for receiving fluid into the cavity, a first outlet portion for discharging fluid from the interior cavity, and a second outlet portion for discharging fluid from the interior cavity.

Preferably, the filter cartridge also includes, a first stage filter disposed within the interior cavity of the housing for conditioning fluid passing therethrough. The first stage filter is in fluid communication with the inlet portion and the first outlet portion by way of a first flow path. A second stage filter is also disposed within the interior cavity of the housing for conditioning fluid passing therethrough. The second stage filter is in fluid communication with the inlet portion and the second outlet portion by way of a second flow path which differs from the first flow path.

In this embodiment, the filter apparatus further includes a first outlet flow valve for selectively controlling the discharge of fluid from the first outlet portion of the housing and a second outlet flow valve for selectively controlling the discharge of fluid from the second outlet portion of the housing. Preferably, the first and second outlet flow valves are positioned external to the filter cartridge housing, but are fluidly connected thereto.

In yet another embodiment, the filter apparatus includes a device for selectively blending the fluid discharged from the first outlet portion and the fluid discharged from the second outlet portion. The blending thereby forming a single discharge of fluid having selected filtration properties. In a preferred embodiment, the device blends the fluid discharged from the first and second outlet portions of the housing and includes a valve. The valve includes a first inlet port for receiving fluid discharged from the first outlet portion of the housing, a second inlet port for receiving fluid discharged from the second outlet portion of the housing, and a discharge port for discharging the blended fluid. Alternatively, the valve can include, a third inlet port which receives fluid which has not been passed through the filter apparatus. As before, the blending forms a single discharge of fluid having selected filtration properties.

The subject invention is also directed to a method of filtration which includes the steps of supplying fluid to a dual-flow filter cartridge, and passing the fluid through the filter cartridge. The dual-flow filter cartridge of this embodiment includes a housing defining a central axis and an interior cavity, a first stage filter and, a second stage filter.

Preferably, the housing has an inlet portion for receiving fluid into the cavity, a first outlet portion for discharging fluid from the interior cavity, and a second outlet portion for discharging fluid from the interior cavity.

The first stage filter is disposed within the interior cavity of the housing for conditioning fluid passing therethrough and providing a first level of filtration. The first stage filter is in fluid communication with the inlet portion and the first outlet portion by way of a first flow path. The second stage filter is disposed within the interior cavity of the housing for conditioning fluid passing therethrough and providing a second level filtration. The second stage filter is in fluid communication with the inlet portion and the second outlet portion by way of a second flow path and further conditions the fluid which has passed through the first stage filter. Alternatively, the fluid bypasses the first stage filter and is only conditioned by the second stage filter.

It is envisioned that the filtration method of the subject invention further includes the step of selectively directing the flow of fluid through the filter cartridge housing such that the fluid traverses through at least one filter stage. In a preferred embodiment, the step of selectively directing the flow of fluid through the filter cartridge housing includes regulating by valve means the discharge of fluid from the first outlet portion and from the second outlet portion.

The subject application is also directed to a filter cartridge that includes, inter alia, a housing defining a central axis and having an inlet port for receiving fluid into the housing. The housing also having a first outlet port for discharging a first fluid from the housing, a second outlet port for discharging a second fluid from the housing, and an interior cavity.

In this embodiment, a first stage filter has a hollow core and is axially disposed within the interior cavity of the housing and conditions the first fluid. The first stage filter communicates with the first outlet portion by way of a first flow path which is substantially radial through the first stage filter. Additionally, a second stage filter is axially disposed within the hollow core of the first stage filter, the second stage filter conditions the second fluid and communicates with the second outlet portion by way of a second flow path. The second flow path is substantially radially inwardly directed through the second stage filter.

Those skilled in the art will readily appreciate that the subject invention allows for greater selectivity in fluid filtration than prior art filtration devices, without increasing the number of components in the filter assembly or the space requirements. These and other unique features of the filter apparatus disclosed herein will become more readily apparent from the following description, the accompanying drawings and the appended claims.

BRIEF DESCRIPTION OF THE DRAWINGS

So that those having ordinary skill in the art to which the subject invention appertains will more readily understand how to make and use the same, reference may be had to the drawings wherein.

These and other features of the subject invention will become more readily apparent to those having ordinary skill in the art form the following detailed description of the preferred embodiments.

DETAILED DESCRIPTION OF PREFERRED EMBODIMENTS

As discussed hereinabove, the present invention overcomes several of the disadvantages associated with prior art fluid filtration cartridges and assemblies. The advantages, and other features of the filtration cartridge disclosed herein, will become more readily apparent to those having ordinary skill in the art from the following detailed description of the preferred embodiments taken in conjunction with the drawings which set forth representative embodiments of the present invention.

Figure 1:
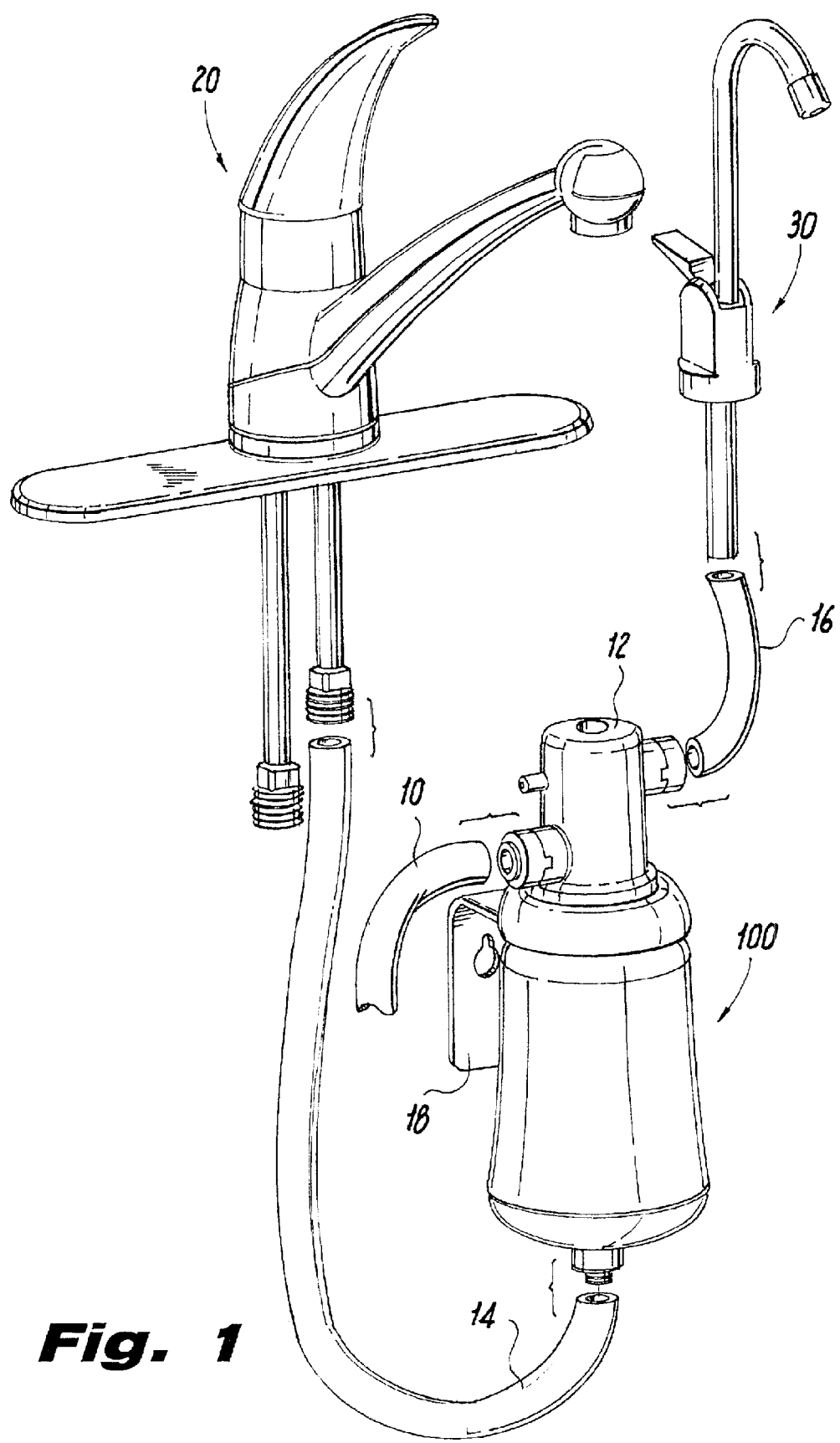
FIG. 1 is perspective view of a filter apparatus constructed in accordance with a preferred embodiment of the subject invention shown in conjunction with a faucet for tap water and a fountain for drinking water.

Referring now to the drawings wherein like reference numerals identify similar structural elements of the subject invention, there is illustrated in FIG. 1 a filtration cartridge constructed in accordance with a preferred embodiment of the subject invention us and designated generally by reference numeral 100. Filter cartridge 100 is illustrated in conjunction with a residential plumbing fixture that includes faucet assembly 20 and drinking fountain assembly 30. In this configuration, filter cartridge 100 is fluidly connected to an unfiltered cold water supply by conduit 10 through filter head 12. The cold water provided by supply conduit 10 is passed through filter cartridge 100 and is selectively discharged through a first discharge conduit 14, a second discharge conduit 16, or simultaneously through both.

First discharge conduit 14 is fluidly connected to faucet assembly 20 and provides tap water having a first level of filtration for performing domestic tasks such as dishwashing. Second discharge conduit 16 is fluidly connected to drinking fountain assembly 30 and provides potable water having a second level of filtration or conditioning relative to the first level of conditioning. In this embodiment of the invention, it is envisioned that filter cartridge 100 is installed below the level of the sink, e.g., within the cabinetry (not shown). A mounting element, such as L-shaped bracket 18, is used to mount filter cartridge 100 to a supporting structure.

As noted above, in FIG. 1, filter cartridge 100 is shown in use with a residential sink assembly, but those skilled in the art will readily appreciate that filter 100 can be used to provide conditioning for various fluids in a multitude of applications, such as residential, industrial and healthcare applications.

Figure 2:
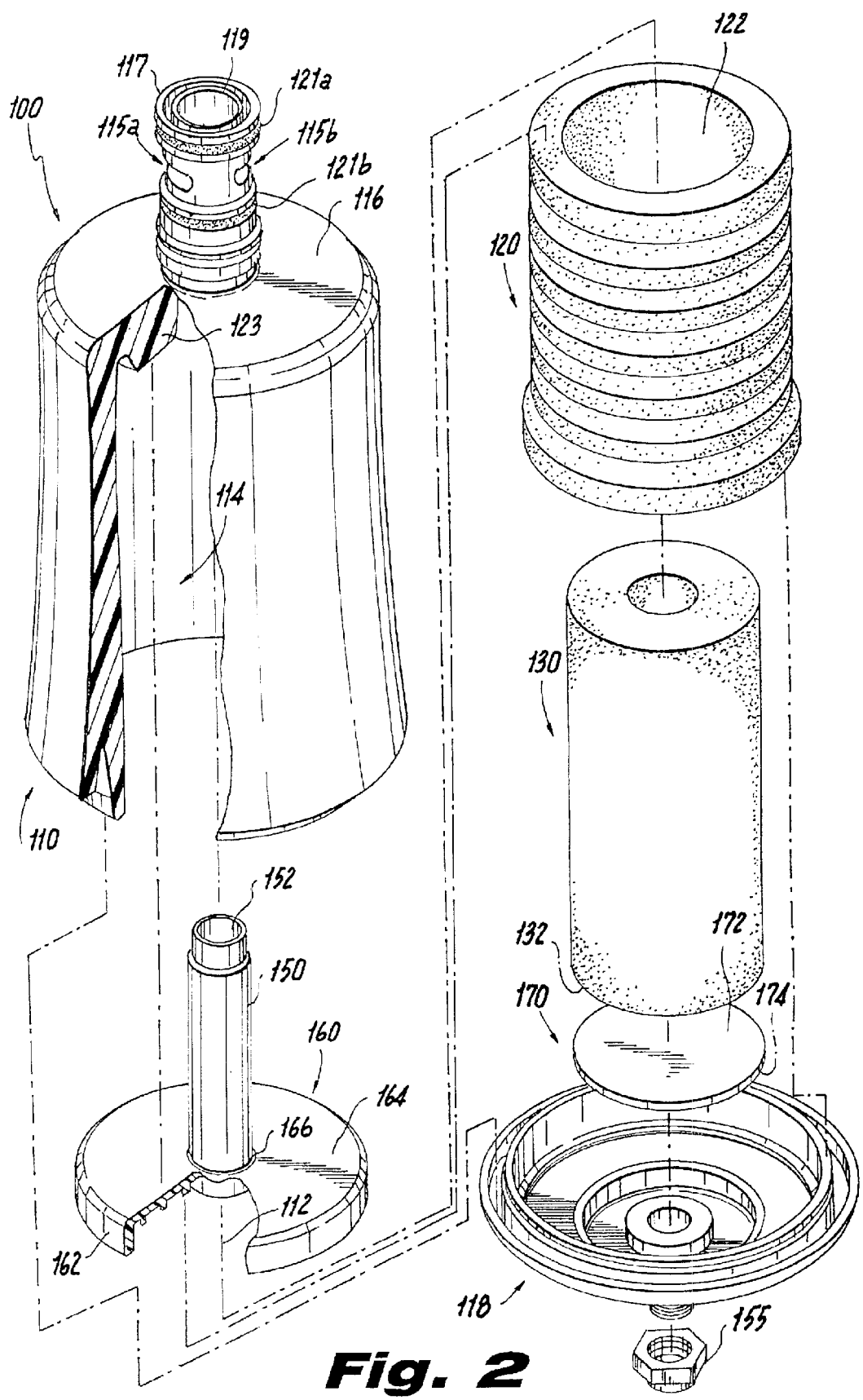
FIG. 2 is an exploded perspective view of the filter cartridge of FIG. 1 which includes a housing defining an interior cavity, a first stage filter, a second stage filter and a structure directing the flow of fluid through first and second flow paths.

Referring now to FIG. 2, filter cartridge 100 primarily includes a housing 110, a first stage filter 120 and a second stage filter 130. The housing 110 defines a central axis 112 and an interior cavity 114 for filter cartridge 100. Housing 110 also includes an inlet portion 116 for receiving fluid into interior cavity 14, a first outlet portion 118 for discharging fluid from interior cavity 114, and a second outlet portion 119 for discharging fluid from interior cavity 114. In the embodiment shown in FIG. 3, a neck portion 117 is associated with the inlet portion 116 and includes opposed first and second inlet ports 115a and 115b, second outlet portion 119 and upper and lower circumferential sealing recesses 121a and 121b for accommodating o-rings. Inlet portion 116 also includes depending radially-spaced apart rib members 123 which provide support for the first and second stage filters 120 and 130 within the interior cavity 114, as well as provide flow channels therebetween for the fluid entering the interior cavity 114.

An upstanding tube 150 is configured for insertion into neck portion 117 and defines an inlet passage 224 and an outlet passage 152. When tube 150 is inserted within neck portion 117 the inlet passage 224 is defined by the gap between the tube 150 and the neck portion 117. The outlet passage 152 is defined by the hollow core of tube 150 and provides a conduit through which fluid can pass from the second stage filter 130 to the discharge portion 119.

Tube 150 has a cup or annular member 160 associated with the lower end thereof. The cup 160 includes a web 164 and a flange 162 that supports the first and second stage filters 120 and 130 within the interior cavity 114. It is envisioned that tube 150 is integral with cup 160 and is molded thereto. Alternatively, as shown in this figure, cup 160 has a separate element and can have a center bore 166 for mounting cup 160 onto the lower end of tube 150. In the embodiment shown herein, threaded connector 155 is used to secure the first conduit 14 (see FIG. 1) to discharge portion 118.

An end cap 170 is disposed within the interior cavity 114 for directing the flow of fluid within the interior cavity 114 of housing 110. In the embodiment shown herein, end cap 170 has substantially planar upper and lower surfaces 172 and 174, Upper surface 172 of end cap 170 is in contact with the bottom portion 132 of the second stage filter 130 and prevents fluid from entering the bottom portion 132 of the second stage filter 130, thereby directing the flow of fluid in a radially inward direction. The operation of end cap 170 is described in more detail hereinbelow with respect to FIGS. 3 and 4.

Figure 3:
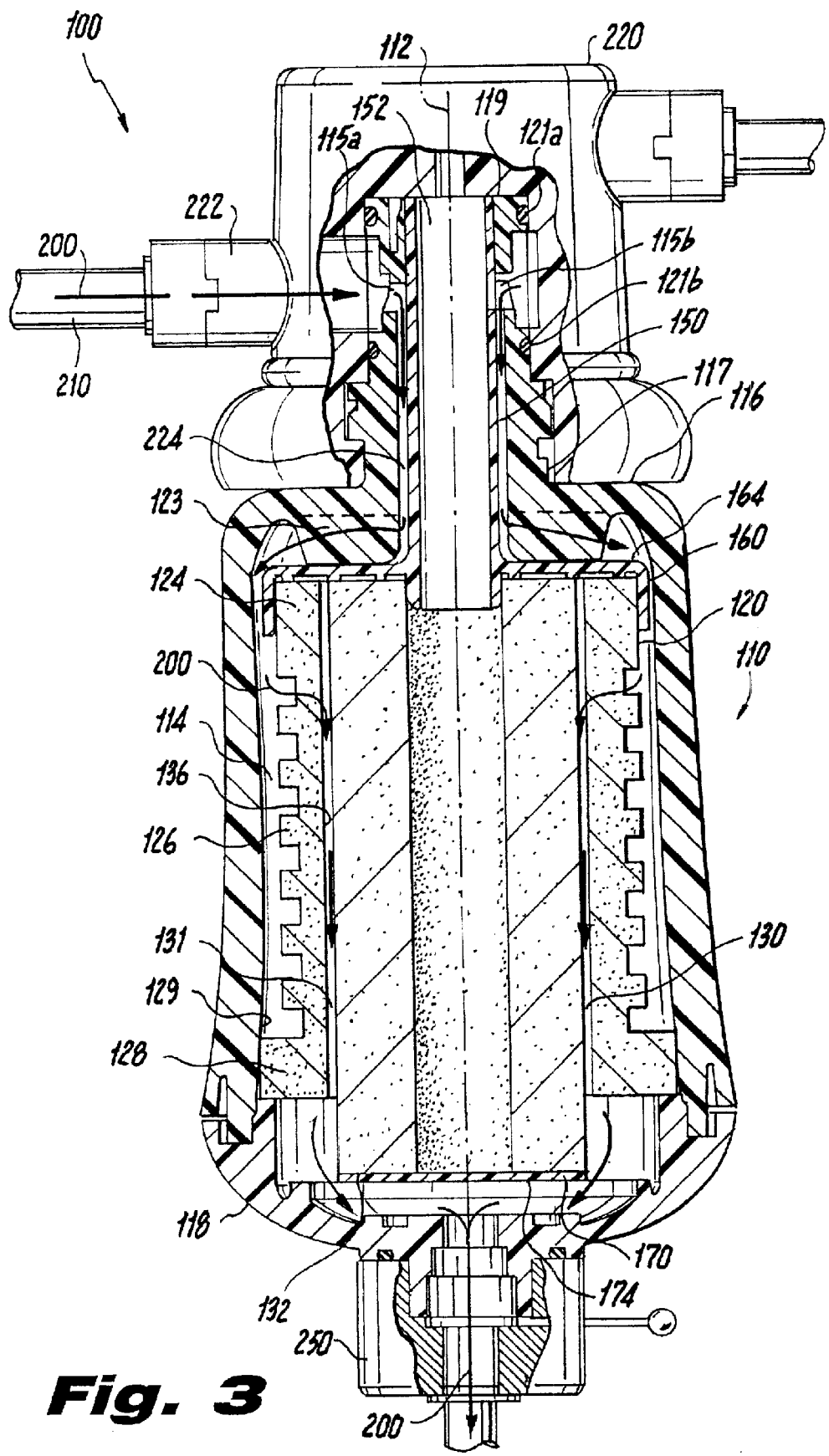
FIG. 3 is a cross-sectional view of a filter cartridge constructed in accordance with a preferred embodiment of the subject invention, which illustrates a first flow path traversing substantially radially through the interior cavity and the first stage filter and exiting the filter housing through a first outlet portion.

Referring to FIG. 3, first stage filter 120, which is disposed within the interior cavity 114 of housing 110, is configured to condition fluid passing therethrough. It is in fluid communication with the inlet portion 116 and first outlet portion 118 by way of a first flow path which is designated by reference numeral 200. The second stage filter 130 is also disposed within interior cavity 114 of housing 110 and it is configured to condition fluid passing therethrough.

In the embodiment illustrated in FIG. 3, the first stage filter 120 and the second stage filter 130 are coaxially positioned relative to one another within the interior cavity 114 of housing 110. The first stage filter 120 defines a hollow core 122 and the second stage filter 130 is disposed within the hollow core 122 of the first stage filter 120. As shown herein, first stage filter 120 is constructed from a single filter media. However, the first stage filter 120 can be constructed from a combination of filter media. The material selected for construction of the first stage filter 120 can be based on the level or type of filtration or conditioning desired for the fluid traversing the first flow path 200. For example, in a residential application, the first stage filter 120 may be a resin bonded cellulose type filter used to remove large particles from the water supply. In other applications such as healthcare, the first stage filter 120 may be a fibrous media for filtering pathogenic microorganisms, such as bacteria.

The first stage filter 120 has an upper annular portion 124 which is supported by cup 160, a middle grooved portion 126, and a lower support portion 128. The grooved portion 126 increases the available surface area of filter 120. The lower support portion 128 is supported by inner wall 129. Preferably, the radially inner surface 136 of the first stage filter 120 does not contacts the second stage filter 130 and a fluid flow gap 131 is established therebetween.

With continuing reference to FIG. 3, in operation filter cartridge 100 is configured to provide two levels of fluid filtration, the two levels of filtration being obtained by passing fluid through two distinct flow paths. First flow path 200 initiates from fluid supply conduit 210 and proceeds into filter head 220 through inlet port 222. Fluid provided by the supply conduit 210 and traversing over the first flow path 200 enters the filter cartridge 100 through the opposed inlet ports 115a and 115b associated with neck portion 117. The first flow path 200 then traverses axially though the inlet passage 224 defined by the gap between tube 150 and neck portion 117. The first flow path 200 proceeds radially along web 164 and through the channels defined by the radially-spaced apart rib members 123 depending from inlet portion 116, and enters into the interior cavity 114. Flow path 200 then traverses primarily radially through the first stage filter 120 into fluid flow gap 131. From there the fluid exists the interior cavity 114 through the first outlet portion 118.

In this embodiment, valve 250 is operatively associated with first outlet as portion 118 for selectively directing the flow of fluid through the interior cavity 114 of housing 110. Valve 250 controls the amount of fluid discharge from first outlet portion 118. However, it should be noted that other structures or mechanisms for selectively directing fluid flow through interior cavity 114 and for controlling the discharge of fluid from first outlet portion 118 can be provided. Also, the controlling structure or mechanism need not be structurally associated with the first outlet portion 118 nor be comprised of a single element. For example, as shown in FIG. 1, faucet assembly 20 is located downstream of first outlet portion 118 and controls the flow of the fluid through interior cavity 114 of housing 110. Also, drinking fountain assembly 30 is fluidly associated with second outlet portion 119 and provides additional control of the fluid flow through interior cavity 114 of filter cartridge 100.

Figure 4:
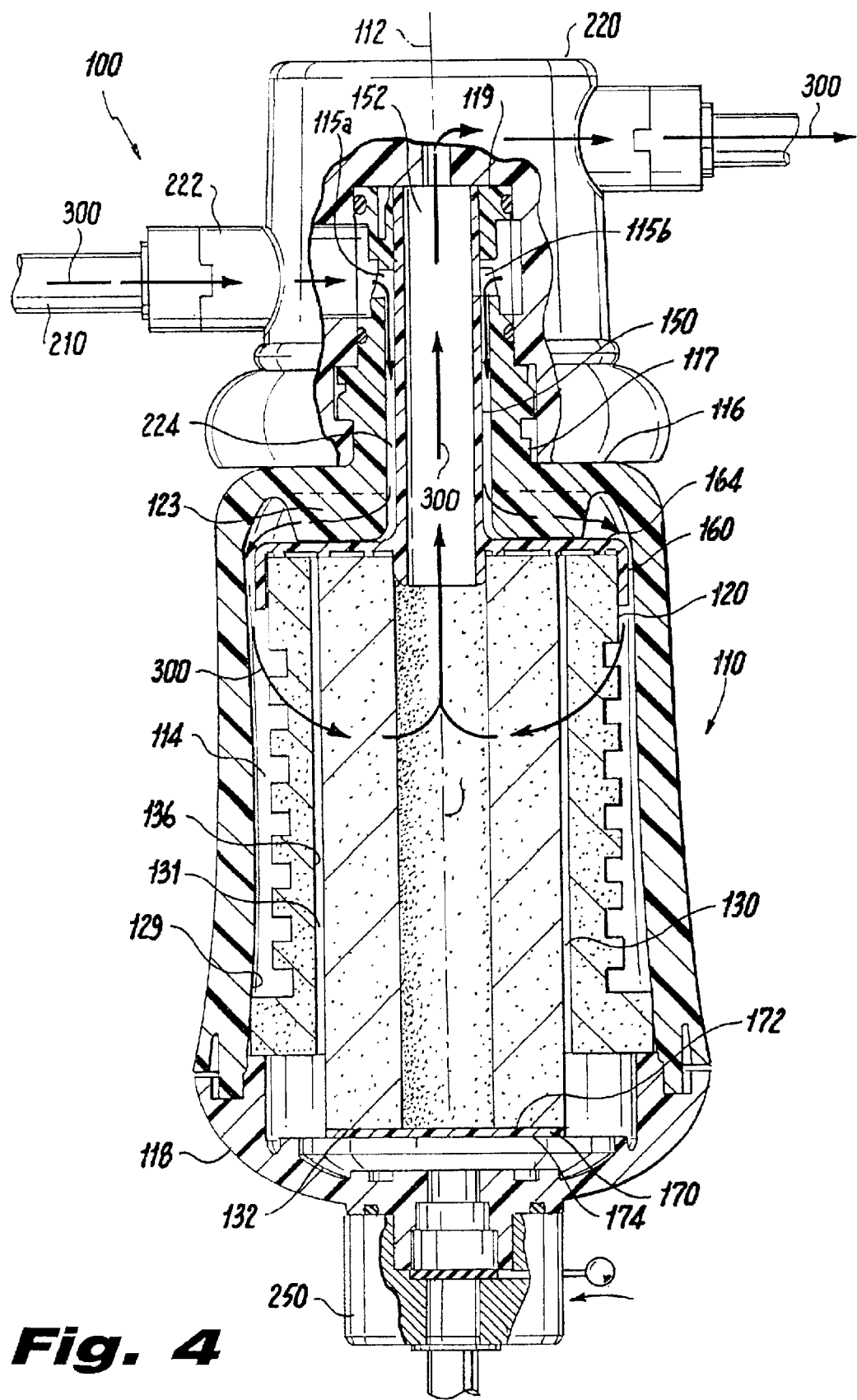
FIG. 4 is a cross-sectional view of a filter cartridge constructed in accordance with a preferred embodiment of the subject invention, which illustrates a second flow path through which fluid traverses the second stage filter and exits the housing through the second outlet portion.

Referring now to FIG. 4, second flow path 300 initiates in a manner similar to that of first flow path 200 in that it originates at fluid supply conduit 210 and proceeds into filter head 220 through inlet port 222. The second flow path 300 then enters filter cartridge 100 through inlet ports 115a and 115b of neck portion 117 and traverses axially though inlet passage 224 defined between tube 150 and neck portion 117. The flow path then proceeds radially along web 164 and into interior cavity 114. Then, unlike the first flow path 200, the second flow path 300 proceeds either radially inward through the first stage filter 120 and second stage filter 130 in a serial manner or is directed into gap 131 defined between first stage filter 120 and second stage filter 130. As a result, the fluid passing therethrough is conditioned twice, by the first stage filter and again by the second stage filter. End cap 170 prevents fluid which has traversed through both the first stage filter 120 and the second stage filter 130 from exiting the interior cavity 114 though the first outlet portion 118 by providing a physical barrier located at the bottom portion 132 of the second stage filter 130.

As described herein, the second stage filter 130 is constructed from a single filter media However, as will be discussed, the second stage filter 130 can be comprised of various filter media having several configurations. For example, the second stage filter 130 can be configured from a fibrous filter media, a carbon block filter media, or any other media suitable for filtering fluid, such as pleated filter media or a spiral wound media. As shown in FIG. 4, the second stage filter is in fluid communication with inlet portion 116 and the second outlet portion 119 by way of second flow path 300 which passes initially through the first stage filter 120.

Filter cartridge 100 further includes a mechanism 250 for selectively directing the flow of fluid through the interior cavity of housing 110. More specifically, mechanism 250 is configured to direct fluid to the first flow path 200 in which fluid traverses through the first stage filter 120 and exits housing 110 through the first outlet portion 118. This is achieved by allowing fluid to proceed through mechanism 250 and eliminating the flow restriction. Mechanism 250 is also configured to direct the flow of fluid to the second flow path 300 or through the first and second flow paths, 200 and 300 simultaneously. Flow is directed through the second flow path 300 when mechanism 250 prevents the flow of fluid from proceeding out of the interior cavity 114 through the first outlet portion 118. Simultaneous flow through the first and second flow paths 200 and 300 can be achieved when fluid with a sufficient inlet flow pressure is supplied by inlet supply conduit 210 and the flow is free to exit the interior cavity 114 through either the first or second outlet portions 118 and 116.

As noted above, the filter cartridge of the subject invention further includes a structure for directing fluid through the first flow path 200 and the second flow path 300. As shown herein, structure 170 is defined as an end cap and is disposed within the interior cavity 114 of the housing 110. The end cap 170 has surfaces dimensioned and configured for directing the flow of fluid. As shown herein, end cap 170 is a planar disk having opposed upper and lower surfaces 172 and 174 which prevent fluid which has passed through the second stage filter from exiting the interior cavity 114 through the first outlet portion 118. Alternatively, end cap 170 can have apertures located near its outer radius which permit the first flow path 200 to traverse through the outer fibers or periphery of the second stage filter 130. The utility of this feature will become more apparent when the various configurations of the second stage filter 130 are discussed in more detail hereinbelow.

It is envisioned that end cap 170 can be removed and replaced with an end cap that provides different flow characteristics within the interior cavity 114. End cap 170 can also be integral with the filter housing 110 or permanently installed and not interchangeable. End cap 170 can also be positioned at the base of the first and second stage filters 120 and 130 as shown in FIG. 4, or at the top of the first and second stage filters 120 and 130. Alternatively, end cap 170 can be located in both positions. In another embodiment, the end cap 170 or a similar structure for directing the fluid through the first and the second flow paths 200 and 300 can be disposed within the filter media.

Figure 5:
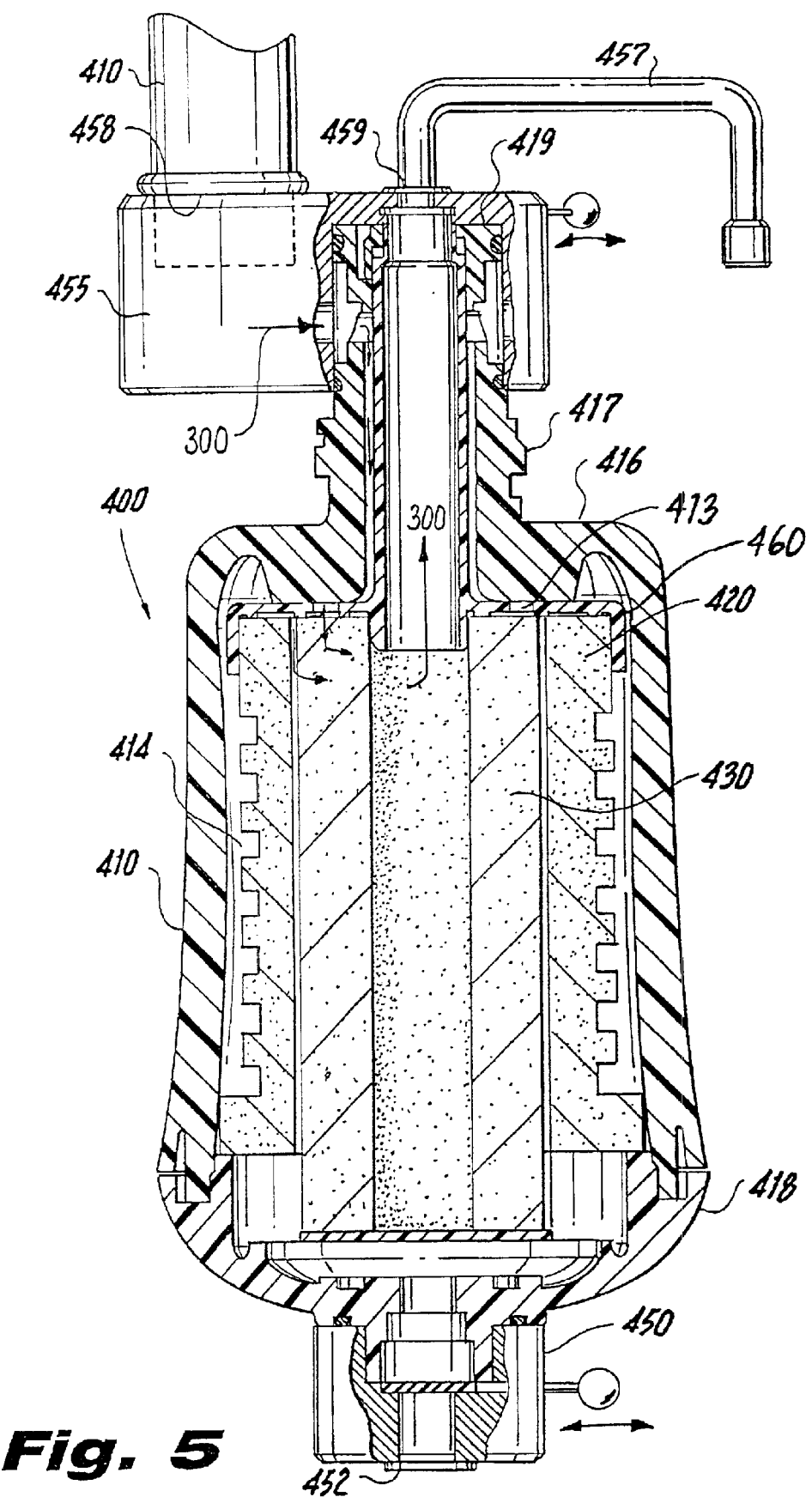
FIG. 5 is a cross-sectional view of a filter cartridge operatively engaged with a water source and having a faucet associated with a first outlet portion and a drinking fountain associated with a second outlet portion.

Referring now to FIG. 5, there is illustrated filter cartridge 400 which includes a housing 410, a first stage filter 420 and a second stage filter 430. Housing 410 defines an interior cavity 414 and has an inlet portion 416, a first outlet portion 418 and a second outlet portion 419. A neck portion 417 is associated with the inlet portion 416 for engaging with outlet flow valve 455. This embodiment differs from the previously described embodiments in that a first outlet flow valve 450 is engaged with the first outlet portion 418 and a second outlet flow valve 455 is fluidly associated with the second outlet portion 419. The first and second outlet flow valves 450 and 455 are directly connected to filter cartridge 400. First outlet flow valve 450 includes a faucet assembly 452 and the second outlet flow valve 455 includes, inlet flow conduit 410 and drinking fountain 457. The second outlet flow valve 455 defines an inlet flow port 458 and outlet flow port 459.

The outlet flow valves 450 and 455 cooperate to selectively direct the flow of fluid through interior cavity 414. More specifically when the first outlet flow valve 450 is in the open position and the second outlet flow valve 455 is in the closed position, flow proceeds over the first flow path 200 and the fluid is conditioned by the first stage filter 420 and exists the interior cavity through the first outlet portion 418 and the faucet assembly 452. Alternatively, when the first outlet flow valve 450 is in the closed position and the second outlet flow valve 455 is open, the flow proceeds over the second flow path 300 and the fluid passes through and is conditioned by both the first and second stage filters 420 and 430, and exists the interior cavity 414 through the second outlet portion 416 and drinking fountain assembly 457. Alternatively, when both the first and the second outlet flow valves 450 and 455 are in the open position, fluid will proceed through the interior cavity 414 over both the first and the second flow paths 200 and 300 and will be discharged from both the faucet and drinking fountain assemblies 452 and 457.

Additionally, the second flow path 300 for the filter cartridge 400 disclosed herein does not proceed through the first stage filter 420. Instead, the second flow path 300 proceeds through apertures 413 formed in cup 460 thereby bypassing the first stage filter 420.

Figure 6:
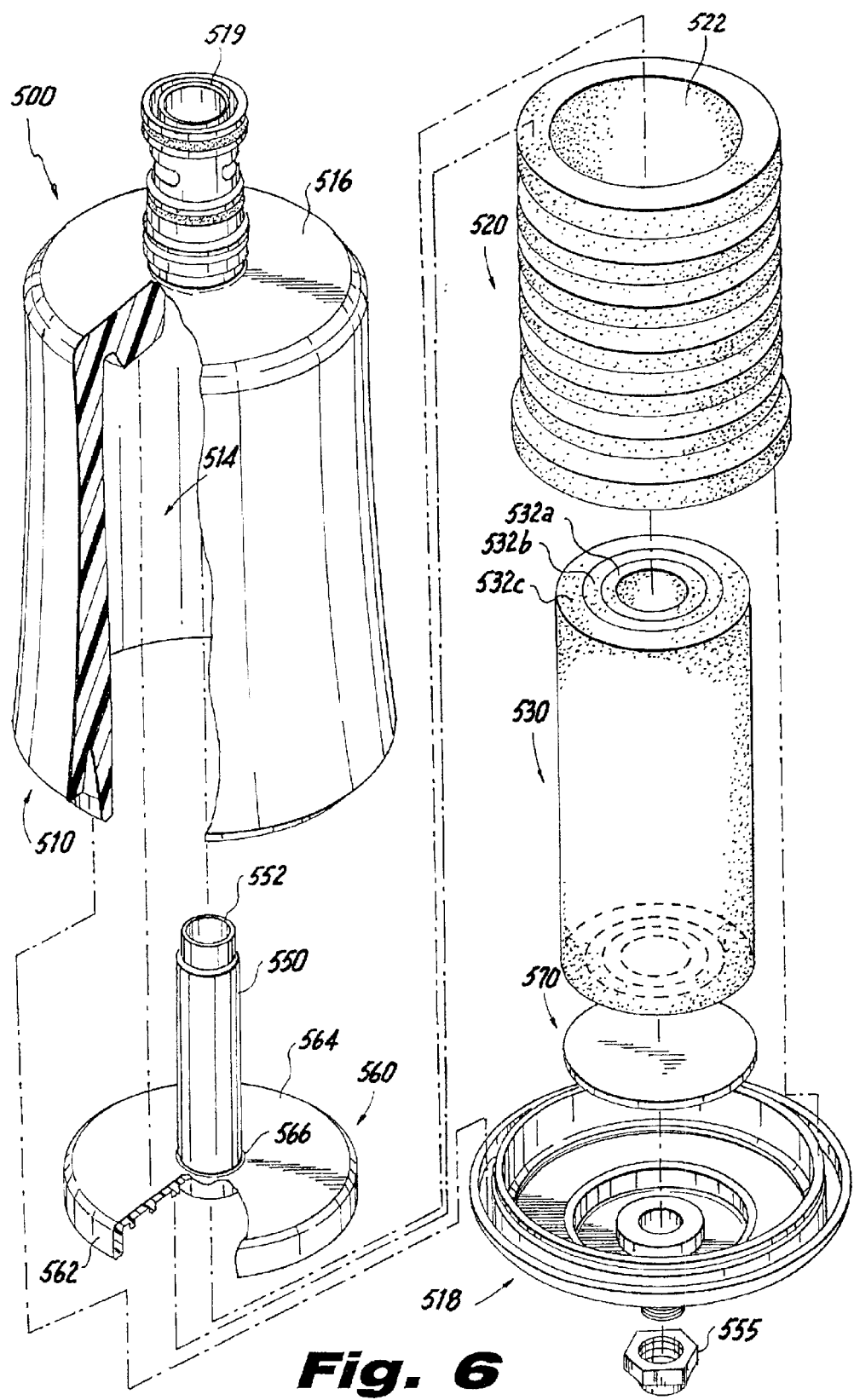
FIG. 6 is an exploded perspective view of a filter cartridge constructed in accordance with a preferred embodiment of the subject invention with parts separated for ease of illustration, wherein the second stage filter includes a plurality of filter media layers which are coaxially positioned relative to one another.

Referring to FIG. 6 there is illustrated filter cartridge 500 which includes housing 510, first stage filter 520 and second stage filter 530. Housing 510 defines interior chamber 514 and has inlet portion 516, first outlet portion 518 and second outlet portion 519. Filter cartridge 500 is substantially similar in structure and function to filter cartridge 100 (FIG. 2) and like reference numerals identify similar structural elements. Filter cartridge 500 differs from the previously discussed filter cartridge 100 in that the second stage filter 530 includes three concentric layers or sections of filter media, 532a–532c. Each concentric layer or section 532a–532c can have selected filtration properties, such as porosity, based on the desired fluid quality. In the embodiment disclosed herein, end cap 570 is disposed within the interior cavity 514 and has planar upper and lower surface. However, in an alternative embodiment, end cap 570 can have radially-spaced apart apertures located directly below either of concentric layers 532a–532c. For example, if the apertures in end cap 570 were located below layer 532b, then the fluid traversing over the first flow path would be allowed to proceed through the first stage filter 520 and then through layers 532b and 532c of the second stage filter 530 to the apertures in end cap 570 al and exits the interior chamber 514 through the first outlet portion 518.

Figure 7:
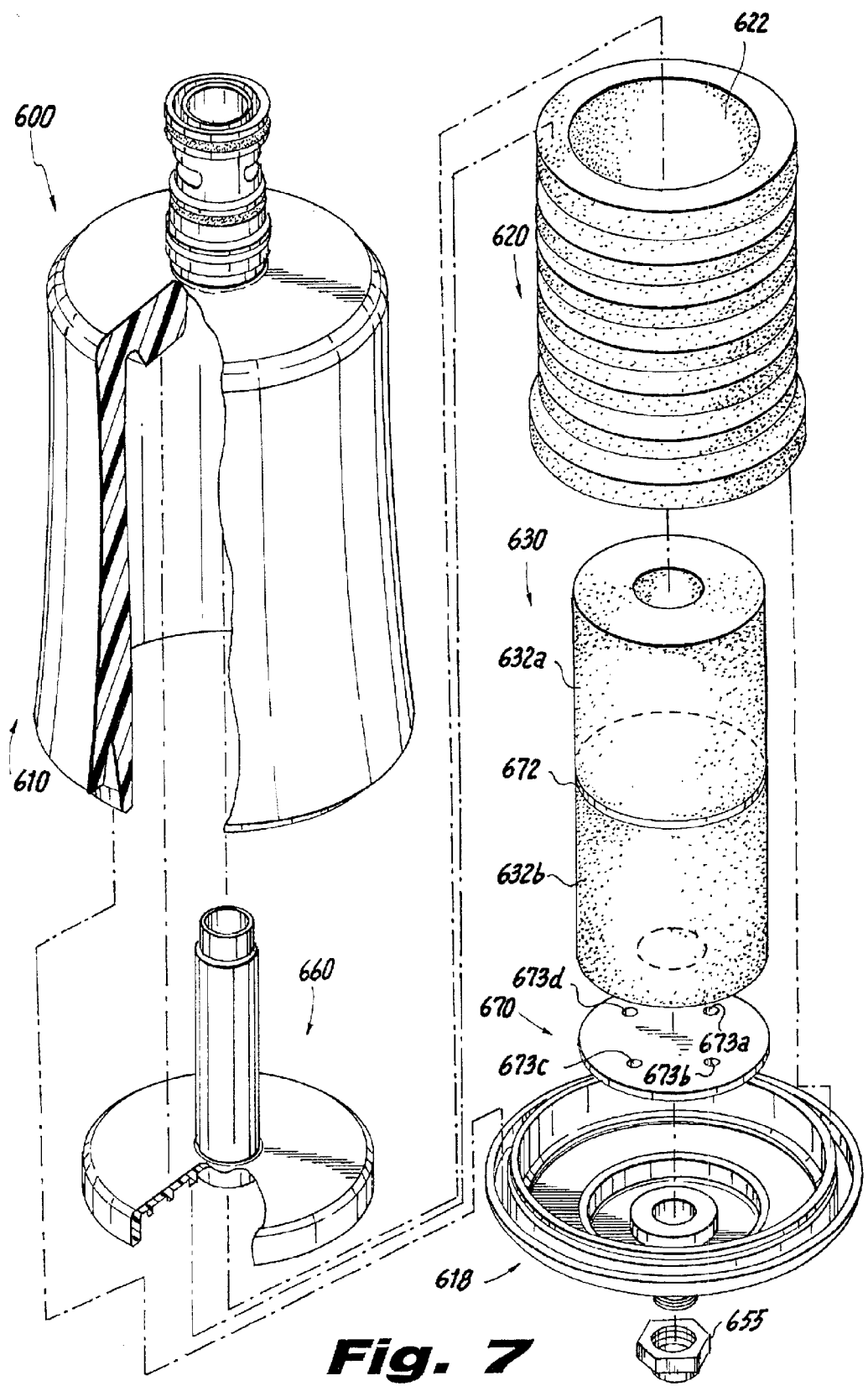
FIG. 7 is an exploded perspective view of a filter cartridge constructed in accordance with a preferred embodiment of the subject invention, wherein the second stage filter includes two cylindrical filter elements arranged in vertically stacked orientation.

Referring now to FIG. 7, there is illustrated another embodiment of the subject invention and designated generally by reference numeral 600. Filter cartridge 600 includes housing 610, first stage filter 620 and second stage filter 630. Housing 610 defines interior chamber 614 and has inlet portion 616, first outlet portion 618 and second outlet portion 619. Filter cartridge 600 is substantially similar in structure and function to filter cartridge 100 (FIG. 2) and like reference numerals identify similar structural elements. Filter cartridge 600 differs from the previously described filter cartridge 100 in that second stage filter 630 includes two cylindrically-shaped media elements 632a and 632b that have selected filtration properties based on the desired fluid quality. In addition, plate 672 is disposed between media elements 632a and 632b and directs the flow of fluid within the interior cavity 114. For example, plate 672 in conjunction with apertures 673a–673d disposed in end cap 570 allow fluid which is traversing the first flow path (not shown) to proceed through filter layer 632b in addition to the first stage filter 620. Structure 672 also prevents fluid which is traversing the second flow path from proceeding through filter layer 632b while allowing it to traverse filter layer 632a.

Figure 8:
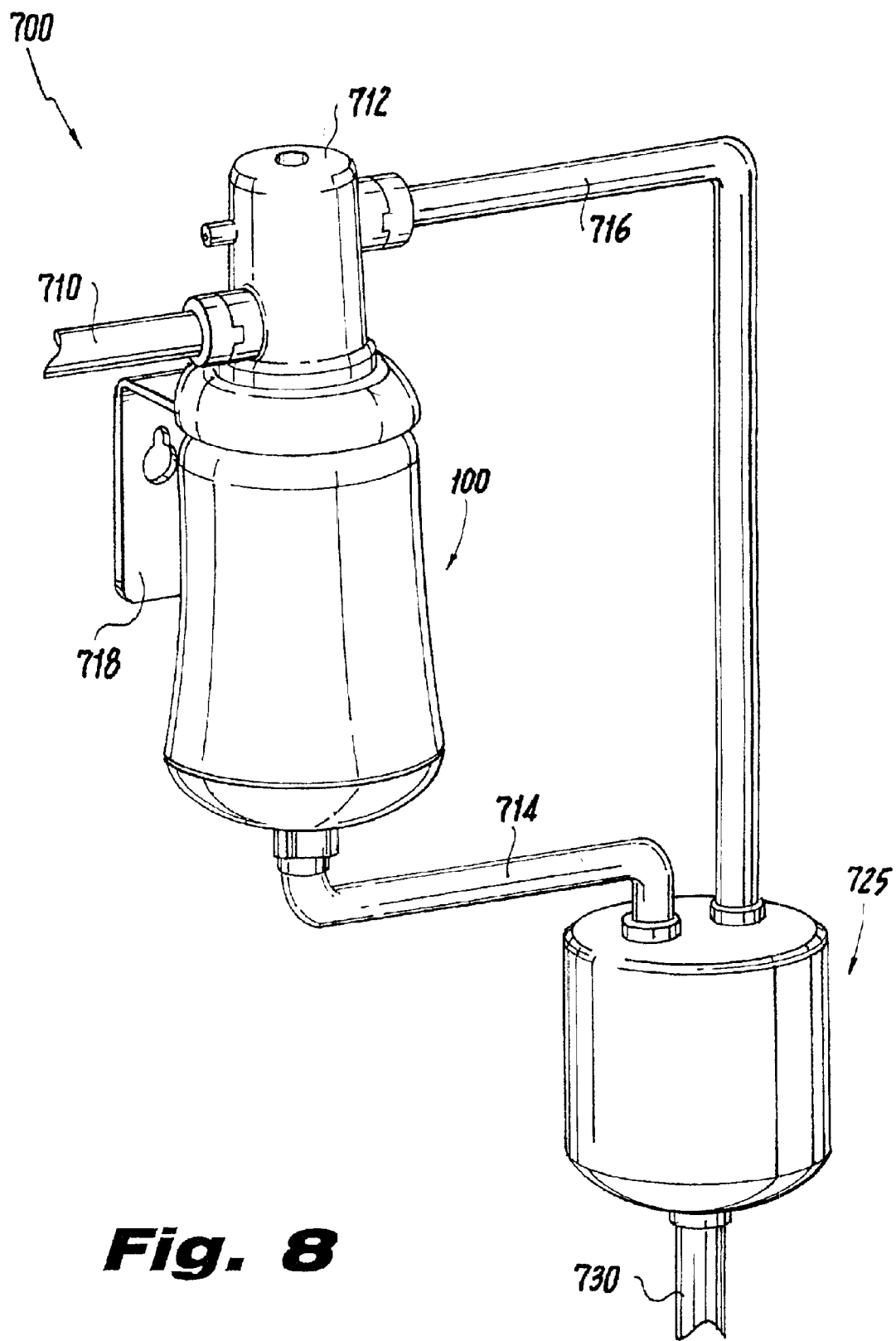
FIG. 8 is a perspective view of a filtration system incorporating the filtration apparatus of the subject invention together with a blending device having an inlet port which receives fluid from the first outlet portion, an inlet port which receives fluid from the second outlet portion, and a single discharge port.

Referring to FIG. 8, there is illustrated filter assembly 700 which includes, a filter cartridge 100, ahead 712, an L-shaped support bracket 718, a water supply conduit 710, first discharge conduit 714, second discharge conduit 716 and blending device 725. Blending device 725 selectively blends the fluid discharged from the first outlet portion and the fluid discharged from the second outlet portion of filter cartridge 100. More specifically, fluid is supplied by water supply 710 to filter cartridge 100. As described in greater detail with respect to FIGS. 3 and 4, the fluid proceeds over two flow paths with filter cartridge 100. The fluid which exits cartridge 100 through the first discharge conduit 714 has been subjected to a first level of conditioning and the fluid exiting cartridge 100 through the second discharge conduit 716 has been subject to a second level of conditioning. Blending device 725 receives the fluid from both the first and second discharge conduits 714 and 716 and allows the user to selectively blend the received fluid thereby creating a single discharge of fluid having selected filtration properties. The blended fluid is discharged through discharge conduit 730.

In a preferred embodiment, blending device 725 includes a valve having first and second inlet ports and a discharge port. The first inlet port receives fluid discharged from the first outlet portion of filter cartridge 100 and the second inlet port receives the fluid discharged from the second outlet portion. The valve can be equipped to allow the user to either locally or remotely select the properties of the blended fluid and to discharge the fluid from the blending device.

Figure 9:
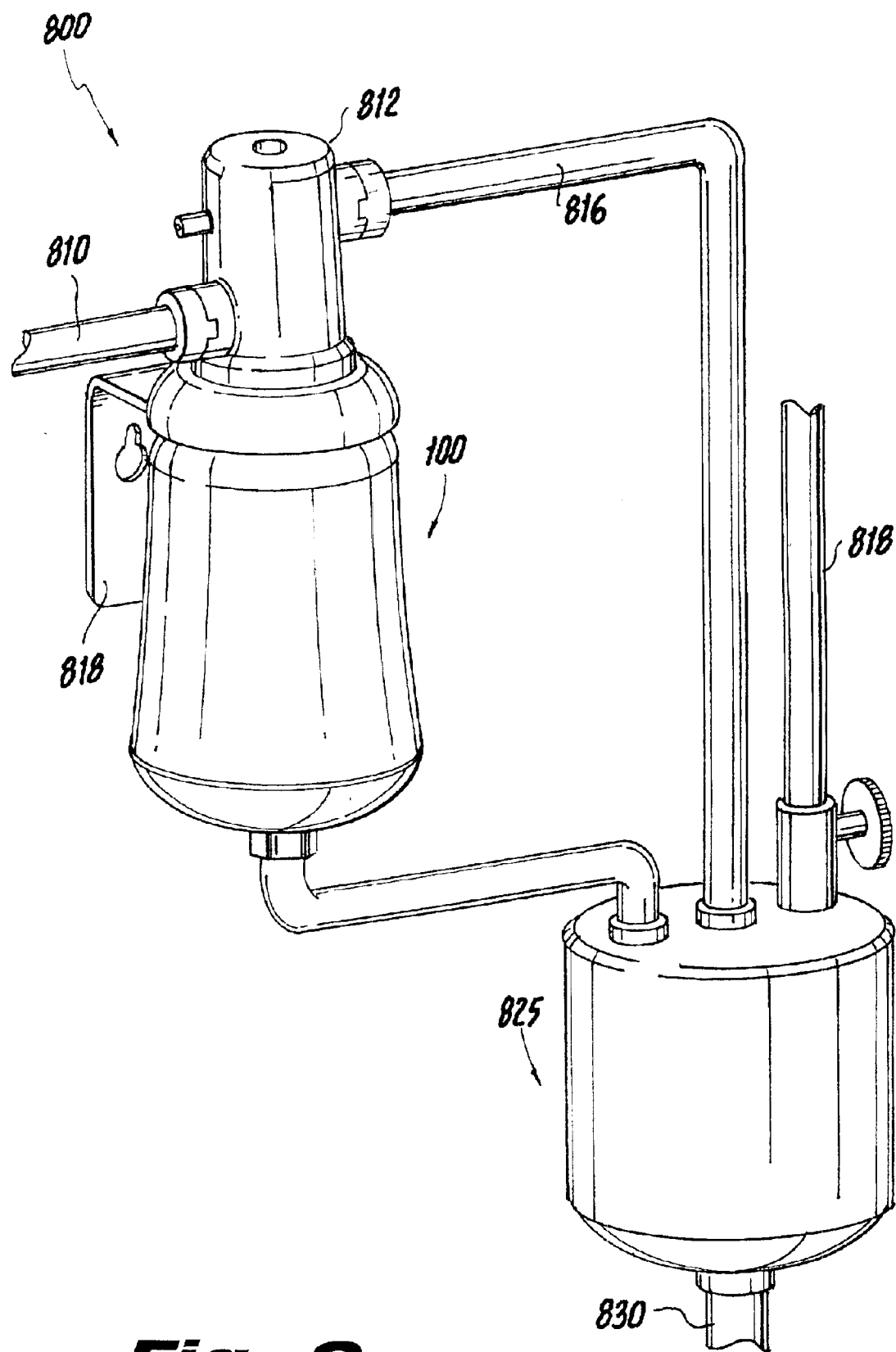
FIG. 9 is a perspective view of a filtration system incorporating the filtration apparatus of the subject invention together with a blending device having an inlet port which receives fluid from the first outlet portion, an inlet port which receives fluid from the second outlet portion, an inlet port receiving unfiltered fluid from the water supply, and a single discharge port.

Referring now to FIG. 9, there is illustrated an alternate embodiment of the filter apparatus disclosed in FIG. 8, and designated by reference numeral 800. Filter apparatus 800 is substantially similar in structure and function to filter apparatus 700 (FIG. 8) and like reference numerals identify similar structural elements. Filter apparatus 800 differs in that the blending device 825 also receives fluid from unfiltered supply conduit to 818, in addition to first discharge conduit 814, second discharged conduit 816. As before, blending device 825 allows the user to selectively blend the received fluid thereby creating a single discharge of fluid having selected filtration properties.

While the invention has been described with respect to preferred embodiments, those skilled in the art will readily appreciate that various changes and/or modifications can be made to the invention without departing from the spirit or scope of the invention as defined by the appended claims.

What is claimed is:

1. A filter cartridge comprising:
   a) a housing defining a central axis and an interior cavity, the housing having a substantially central inlet portion for receiving fluid into the cavity, a first outlet portion for discharging fluid from the interior cavity, and a second outlet portion for discharging fluid from the interior cavity;
   b) a first stage filter disposed within the interior cavity of the housing for conditioning fluid passing therethrough, the first stage filter in fluid communication with the inlet portion and the first outlet portion by way of a first flow path; and
   c) a second stage filter disposed within the interior cavity of the housing for conditioning fluid passing therethrough, the second stage filter in fluid communication with the inlet portion and the second outlet portion by way of a second flow path which is distinct from the first flow path wherein the first stage filter and the second stage filter are coaxially positioned relative to one another within the interior cavity of the housing and wherein the first stare filter has a hollow core and the second stage filter is disposed within the hollow core of the first stare filter.

2. The filter cartridge of claim 1, further comprising means for selectively directing the flow of the fluid through the interior cavity of the housing.

3. The filter cartridge of claim 2, wherein the means for selectively directing the flow of the fluid through the interior cavity of the housing is configured to direct fluid to the first flow path in which fluid traverses through the first stage filter and exits the housing through the first outlet portion.

4. The filter cartridge of claim 2, wherein the means for selectively directing the flow of the fluid through the interior cavity of the housing is configured to direct fluid to the second flow path through which fluid traverses the second stage filter and exits the housing through the second outlet portion.

5. The filter cartridge of claim 2, wherein the means for selectively directing the flow of the fluid through the interior cavity of the housing is configured to direct fluid to simultaneously flow through the first and second flow paths and simultaneously discharge from the first and second outlet portions.

6. The filter cartridge of claim 1, wherein the first stage filter includes at least one filter media for conditioning the fluid.

7. The filter cartridge of claim 6, wherein the at least one filter media is defined by resin bonded cellulose.

8. The filter cartridge of claim 1, wherein the second stage filter includes at least one filter media for conditioning the fluid.

9. The filter cartridge of claim 8, wherein the at least one filter media is defined by a carbon block filter media.

10. The filter cartridge of claim 8, wherein the at least one filter media is defined by a hollow fiber filter media.

11. The filter cartridge of claim 1, wherein the second flow path traverses both the first and second stage filters.

12. The filter cartridge of claim 1, wherein the first flow path is substantially radially inwardly directed within the interior cavity of the housing through the first stage filter.

13. The filter cartridge of claim 1, wherein the second flow path is substantially radially inwardly directed within the interior cavity of the housing through the second stage filter.

14. The filter cartridge of claim 1, further comprising:
   means for directing the flow of fluid through the first flow path and the second flow path.

15. The filter cartridge of claim 14, wherein the means for directing fluid through the first flow path and the second flow path is defined by a structure disposed within the interior cavity of the housing, the structure having surfaces dimensioned and configured for directing the flow of fluid.

16. The filter cartridge of claim 14, wherein the means for directing fluid through the first flow path and the second flow path is integral with the housing.

17. A filter apparatus comprising:
   a) a head having an inlet flow port, an outlet flow port, means for securing the head in fluid communication with a fluid supply, and means for securably attaching a filter cartridge to the head;
   b) a filter cartridge including:
      i) a housing defining a central axis and an interior cavity, the housing having an inlet portion for receiving fluid into the interior cavity, a first outlet portion for discharging fluid from the interior cavity, and a second outlet portion for discharging fluid from the interior cavity;
      ii) a first stage filter disposed within the interior cavity of the housing for conditioning fluid passing therethrough, the first stage filter in fluid communication with the inlet portion and the first outlet portion by way of a first flow path; and
      iii) a second stage filter disposed within the interior cavity of the housing for conditioning fluid passing therethrough, the second stage filter in fluid communication with the inlet portion and the second outlet portion by way of a second flow path which differs from the first flow path
   c) means for selectively blending the fluid discharged from the first outlet portion and the fluid discharged from the second outlet portion, the blending thereby forming a single discharge of fluid having selected filtration properties.

18. The filter apparatus of claim 17, further comprising a first outlet flow valve for selectively controlling the discharge of fluid from the first outlet portion of the housing.

19. The filter apparatus of claim 17, further comprising a second outlet flow valve for selectively controlling the discharge of fluid from the second outlet portion of the housing.

20. The filter apparatus of claim 17, wherein the means for selectively blending the fluid discharged from the first and second outlet portions of the housing includes a valve, the valve having a first inlet port for receiving fluid discharged from the first outlet portion of the housing, a second inlet port for receiving fluid discharged from the second outlet portion of the housing, and a discharge port for discharging blended fluid from the valve.

21. A filter apparatus comprising:
a) a head having an inlet flow port, an outlet flow port, means for securing the head in fluid communication with a fluid supply, and means for securably attaching a filter cartridge to the head;
b) a filter cartridge including:
   i) a housing defining a central axis and an interior cavity, the housing having an inlet portion for receiving fluid into the interior cavity, a first outlet portion for discharging fluid from the interior cavity, and a second outlet portion for discharging fluid from the interior cavity;
   ii) a first stage filter disposed within the interior cavity of the housing for conditioning fluid passing therethrough, the first stage filter in fluid communication with the inlet portion and the first outlet portion by way of a first flow path; and
   iii) a second stage filter disposed within the interior cavity of the housing for conditioning fluid passing therethrough, the second stage filter in fluid communication with the inlet portion and the second outlet portion by way of a second flow path which differs from the first flow path; and
c) means for selectively blending the fluid discharged from the first outlet portion, the fluid discharged from the second outlet portion and fluid that has not passed through the filter apparatus, the blending thereby forming a single discharge of fluid having selected filtration properties.

22. A filter cartridge comprising:
a) a housing defining a central axis and an interior cavity for the filter cartridge and having an inlet port located for receiving fluid into a substantially central inlet portion of the interior cavity, a first outlet port for discharging a first fluid from the interior cavity, a second outlet port for discharging a second fluid from the housing, and an interior cavity;
b) a first stage filter axially disposed within the interior cavity of the housing for conditioning the first fluid, the first stage filter having a hollow core and communicating with the first outlet port by way of a first flow path which is substantially radially directed through the first stage filter; and
c) a second stage filter coaxially disposed within the hollow core of the first stage filter for conditioning the second fluid, the second stage filter communicating with the second outlet port by way of a second flow path which is substantially radially inwardly directed through the second stage filter and wherein the first stage filter and the second stage filter are coaxially positioned relative to one another within the interior cavity of the housing and wherein the first stare filter has a hollow core and the second stage filter is disposed within the hollow core of the first stage filter.

23. The filter cartridge of claim 22, wherein the first stage filter comprises at least one filter media for filtering the fluid.

24. The filter cartridge of claim 23, wherein the at least one filter media comprises a diatomaceous earth media.

25. The filter cartridge of claim 22, wherein the second stage filter comprises at least one filter media for filtering the fluid.

26. The filter cartridge of claim 25, wherein the at least one filter media comprises carbon block filter media.

27. The filter cartridge of claim 25, wherein the at least one filter media comprises hollow fiber filter media.

28. The filter cartridge of claim 22, further comprising means for directing fluid through the first flow path and the second flow path.

29. The filter cartridge of claim 28, wherein the means for directing fluid through the first flow path and the second flow path includes a structure disposed within the interior cavity of the housing, the structure having surfaces dimensioned and configured for directing the flow of fluid.

30. The filter cartridge of claim 28, wherein the means for directing fluid through the first flow path and the second flow path is integral with the housing.

* * * * *